United States Patent [19]

Glovier

[11] Patent Number: 5,157,316
[45] Date of Patent: Oct. 20, 1992

[54] ROBOTIC JOINT MOVEMENT DEVICE

[76] Inventor: Lloyd H. Glovier, 1011-A Northwood, Murray, Ky. 42071

[21] Appl. No.: 721,151

[22] Filed: Jun. 26, 1991

[51] Int. Cl.[5] ............................................. G05B 19/22
[52] U.S. Cl. ............................. 318/568.11; 318/574; 395/80; 901/15; 180/8.1; 446/299
[58] Field of Search ................................. 318/560-646; 364/513; 901/3, 9.1, 8, 12, 16-27; 446/355-466; 40/416-418; 180/8.6, 8.1; 395/80-99

[56] References Cited

U.S. PATENT DOCUMENTS

| | | | |
|---|---|---|---|
| 4,221,997 | 9/1980 | Flemming | 318/514 |
| 4,561,816 | 12/1985 | Dingess | 901/25 X |
| 4,626,164 | 12/1986 | Chang | 446/354 X |
| 4,641,251 | 2/1987 | Inoue | 901/1 X |
| 4,683,773 | 8/1987 | Diamond | 901/21 X |
| 4,705,999 | 11/1987 | Soji et al. | 364/513 |
| 4,757,458 | 7/1988 | Takemoto et al. | 364/513 |
| 4,794,513 | 12/1988 | Muller | 318/562 X |
| 4,834,200 | 5/1989 | Kajita | 901/1 X |
| 4,887,222 | 12/1989 | Miyake et al. | 901/15 X |
| 4,959,037 | 9/1990 | Garfinkel | 901/15 X |

Primary Examiner—Paul Ip
Attorney, Agent, or Firm—Edward D. Lanquist, Jr.

[57] ABSTRACT

A robotic joint for use in toys to provide locomotion to animated figures, sub-assemblies, and toy construction building sets. The robotic joint is particularly adaptable because one side of the joint carries the motor that is powering the joint. It also provides for four-way action in a joint in a very compact space by attaching a motorized joint directly to the shaft of another motor. It can also provide up to eight-way action in a joint, since each motor turns the shaft or turns the motor housing based on the amount of resistance applied to the shaft. This can be demonstrated in a joint that is used to support a foot in which the foot has a motor for locomotion, and the limb has a motor for locomotion connected by a four-way joint.

9 Claims, 7 Drawing Sheets

ROBOTIC JOINT MOVEMENT DEVICE

BACKGROUND OF THE INVENTION

The present invention relates generally to a robotic joint movement device and more particularly to a motorized joint for locomotion of a robotic limb.

It will be appreciated by those skilled in the art that it is desirous for robots to have joints that bend and move. Further, these joints must bend and move to simulate human movement. To this end, several attempts have been made to provide for locomotion of a robotic joint that can occur without the robotic device losing balance or being too complicated.

One such attempt is disclosed in U.S. Pat. No. 4,425,818, issued to H. Asada et al. on Jan. 17, 1984, for a robotic manipulator. Unfortunately, like much of the prior art, the motor that activates the joints is not placed at each of the joints to be moved. One motor moves several joints.

U.S. Pat. No. 4,283,764, issued to G. Crum et al. on Aug. 11, 1981, is for a manually programmable robot with power assisted motion during programming. Instead of teaching movement of a robotic joint, this patent generally teaches use of a transducer for sensing the position of each joint.

U.S. Pat. No. 4,095,367, issued to I. Ogawa on Jun. 20, 1978, discloses an articulated robot assembly. In this particular instance, the drive means is achieved by gears activating a harmonic scissor device which in turn moves a roller which moves the robot. No other movement is achieved. Human movements are not simulated.

The toy industry has provided a large number of toys with assemblies that have various degrees of independent locomotion and remote control motion. For example, U.S. Pat. No. 4,095,367 discloses a motor in the trunk assembly which is used to drive the transmission of various appendages. Also, U.S. Pat. No. 3,038,275 describes a self-walking doll having motors in each foot which are alternatively driven. However, the prior art has provided no robot assembly which allows the moving part to carry the motor that powers the same part. Also, the prior art has not produced a robotic joint that can have much the same direction movement and control of a human joint.

What is needed, then, is a robotic joint movement device which allows the moving part to carry the motor that is powering the same part. This needed robotic joint movement device must allow the joint to balance the shifting of the weight caused by the motor. This device must also allow for omni-directional pivoting. This robotic device must simulate human movements. This robotic device is presently lacking in the prior art.

SUMMARY OF THE INVENTION

In the present invention, an electronic gear reduced motor with housing rotating around a fixed output shaft is placed on the robotic limb to be moved. The shaft of this motor is then attached at the limb that is stationary with respect to the moving limb. Rotation of the gear reduced motor rotates the limb to be moved in relation to the limb that does not move.

By placing the motor housing on the limb to be moved, the limb can then move both itself, as well as the motor, to be capable of improving balance by controlling the moment arm of the moving limb.

Multiple motors can be placed at the same joint with their shafts placed 90° apart to achieve omni-directional movement.

The principle behind this placement is that the motor will always turn the path of least resistance. The limb to be moved will be the path of least resistance.

Accordingly, one object of the present invention is to achieve a robotic joint movement device.

Still another object of the present invention is to achieve the balanced movement of this robotic limb.

Still another object of the present invention is to provide for omni-directional movement at the joint.

DESCRIPTION OF THE PREFERRED EMBODIMENT

Figure 1:
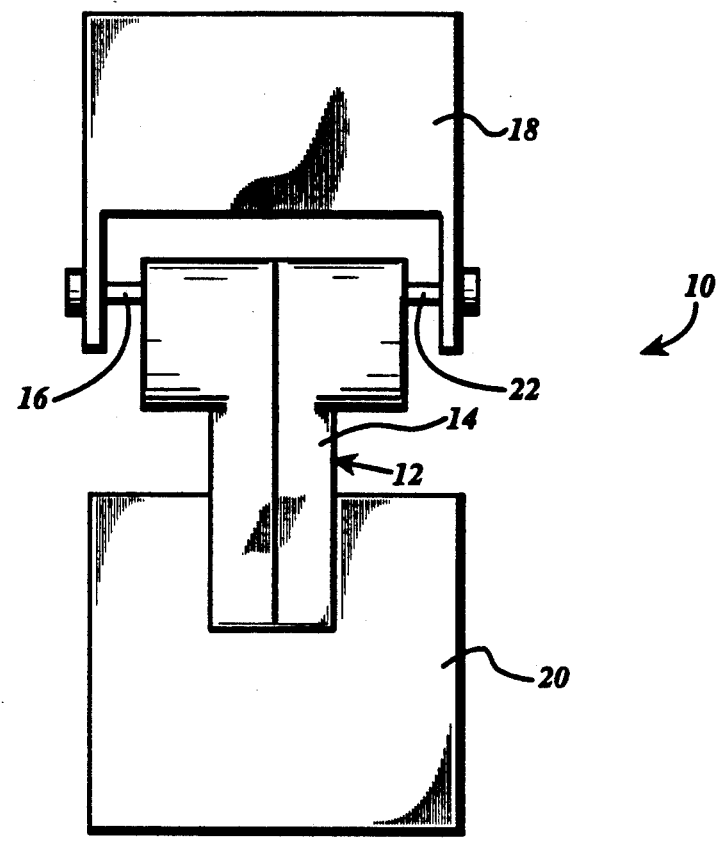
FIG. 1 is a frontal view of the motor housing attached in line with the second limb.

Referring now to FIG. 1, there is shown generally at 10 one embodiment of the robotic joint movement device of the present invention. Housing 14 of motor 12 attaches to upper portion of second limb 20. Shaft 14 of motor 12 attaches to first limb 18. When shaft 16 moves, motor 12 will move whichever limb 18 or 20 has less force applied to it. In most cases, motor 12 will move limb 20. In the embodiment shown in FIG. 1 of device 10, motor 12 is substantially aligned with limbs 18, 20 when limbs 18 and 20 are aligned. Not only does shaft 16 serve as the attachment point to first limb 18, shaft 16, When rotated, provides force between limbs 18, 20. In the preferred embodiment, housing 14 is attached to second limb 20. This attachment can be either fixed attachment or releasable attachment. Conceivably, in any version of device 10 shown, motor 12 can be housed inside a shell that attaches to second limb 20 (not shown).

Figure 2:
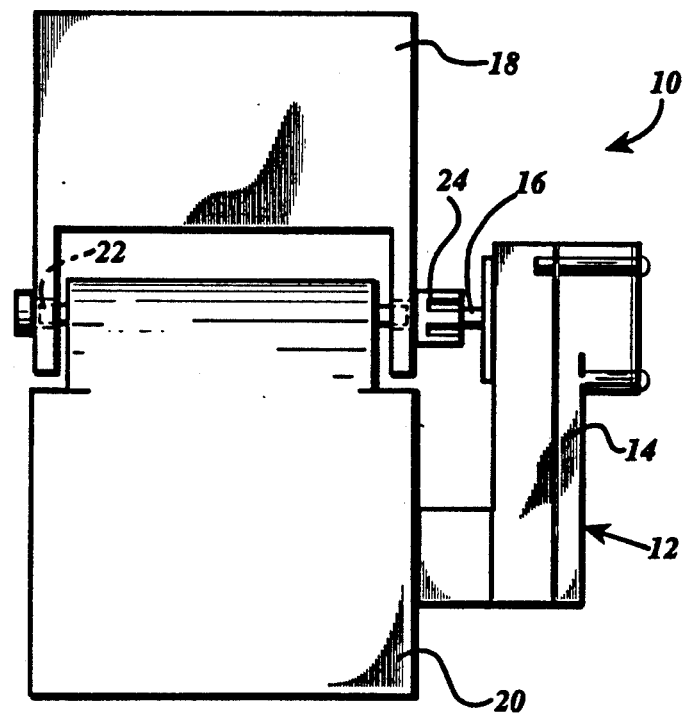
FIG. 2 is a frontal view showing the motor set to the side and attached to an adapter on the second limb.
Figure 3:
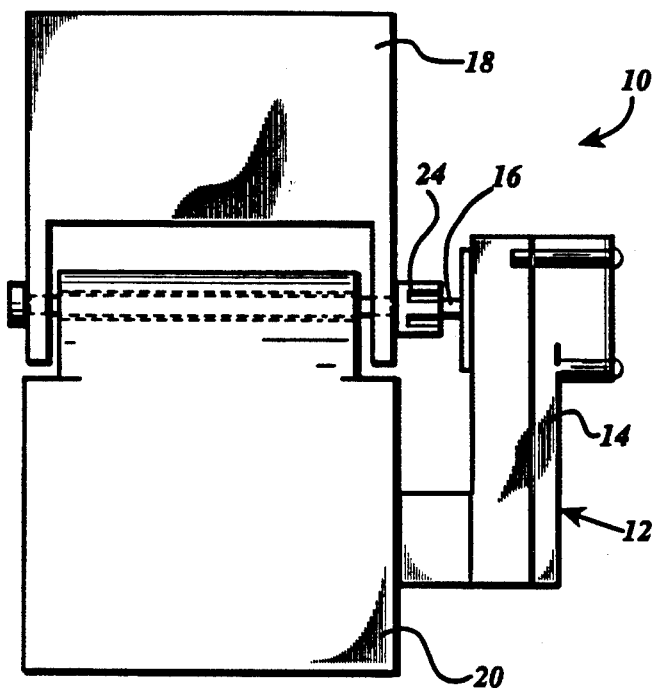
FIG. 3 is a front view of the motor offset to the side of first limb wherein the shaft from the motor passes through the second limb.

Referring now to FIG. 2, there is shown generally at 10 another embodiment of the device. In this embodiment, first limb 18 and second limb 20 are pivotally attached at pin 22. Connection of first limb 18 to second limb 20 is pinned attachment pin 22 is allowed to freely rotate in relation to second limb 20. Housing 14 of motor 12 attaches to second limb 20. Shaft 16 of motor 12 attaches to first limb 18. In this particular embodiment, adapter 24 receives shaft 16. However, shaft 16 could be continuous to form pin 22 also as shown in FIG. 3. In either case, when motor 12 is activated, force is applied between limbs 18, 20 that forces 18 and 20 to pivot around pin 22 with respect to one another. Once again, motor 12 will pivot the limb 18, 20 of least resistance.

Referring now to FIG. 3, there is shown generally at 10 still another embodiment of the present invention. In this instance, shaft 16 of motor 12 forms pin (22 in FIG. 2) that passes through second limb 20 that attaches to first limb 18. Second limb 20 freely rotates around shaft 16. Housing 14 of motor 12 attaches to second limb 20. In this particular embodiment, bushing 26 can have square hole to receive square shaft 16 to ensure that shaft 16 does not rotate in relation to first limb 18.

Figure 4:
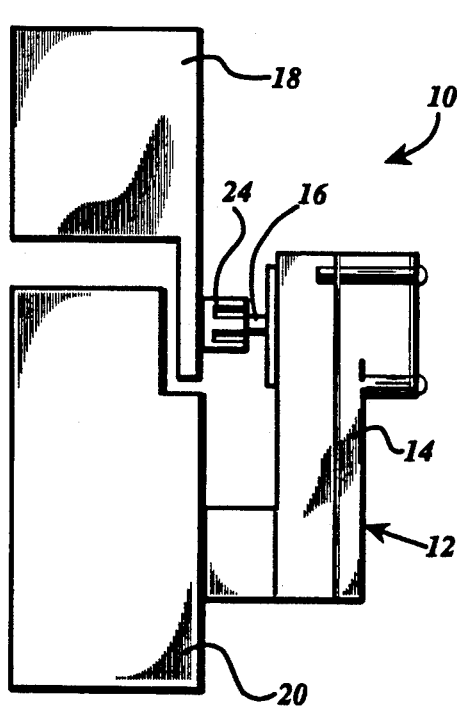
FIG. 4 is a front view showing a joint wherein the first limb and second limb do not contact.

Referring now to FIG. 4, there is shown generally at 10 still another embodiment of the present device. In this instance, first limb 18 is not attached to second limb 20. In this embodiment, housing 14 of motor 12 attaches to second limb 20. Shaft 16 of motor 12 attaches to first limb 18.

Figure 5:
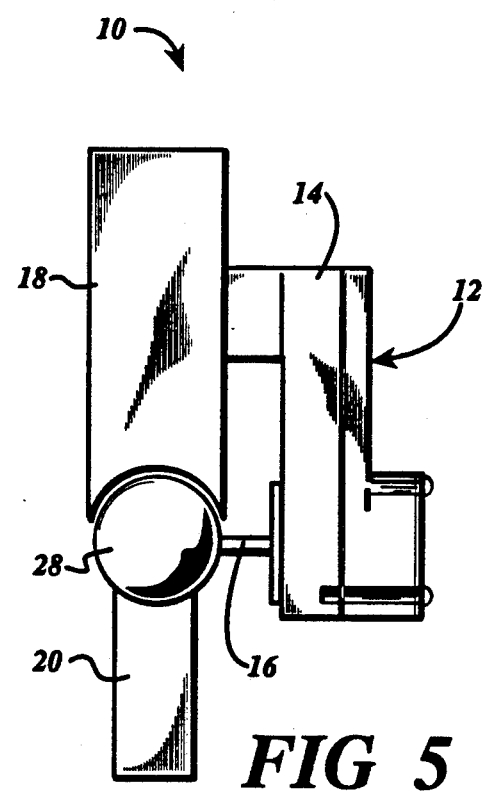
FIG. 5 is a front view showing use of the present device as used with a ball joint.

Referring now to FIG. 5, there is shown generally at 10 still another embodiment of the present invention. In this instance, first limb 18 is pivotally connected to second limb 20 through use of ball joint 28. In this instance, shaft 16 of motor 12 attaches to ball joint 28. Housing 14 of motor 12 attaches to first limb 18. In this instance, joint 28 pivots connect to upper portion of first limb 18.

Figure 6:
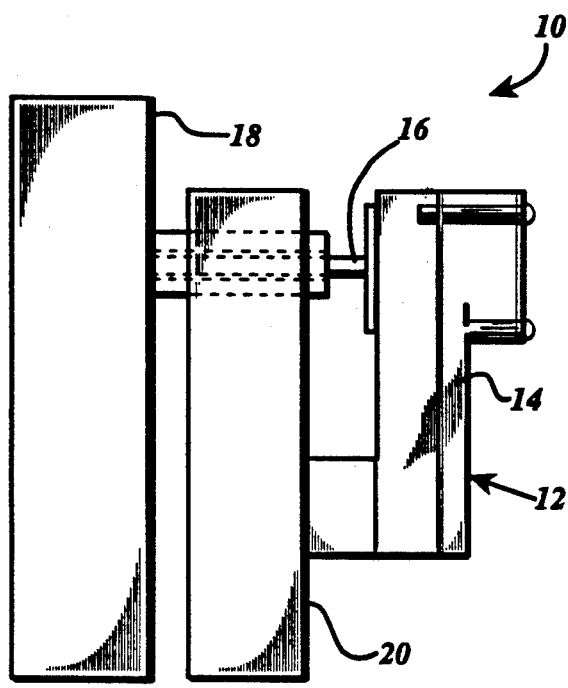
FIG. 6 is a frontal view of the present device showing use of the present device with the two robotic limbs that are not aligned.

Referring now to FIG. 6, there is shown still another embodiment of device 10. In this instance, first limb 18 and second limb 20 are pivotally connected. However, limbs 18, 20 are not placed on the same plane so that either may rotate 360° around the other. Housing 14 of motor 12 attaches to second limb 20. Shaft 16 of motor 12 attaches to first limb 18. Shaft 16 rotates freely and passes through second limb 20.

Figure 7:
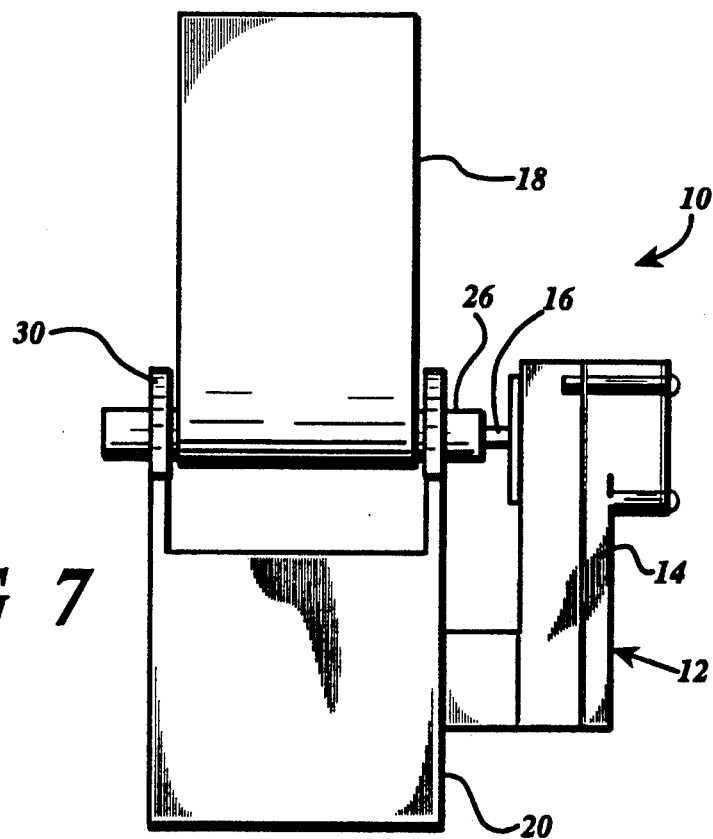
FIG. 7 is a front view showing second limb hooked to first limb.

Referring now to FIG. 7, there is shown generally at 10 still another embodiment of the present invention. Second limb 20 attaches to first limb 18 at hook 30. This is similar to the method construction used by the Fisher-Price ® Construx ® building blocks system. Hook 30 freely pivots around adapter 26 of first limb 18. Housing 14 of motor 12 attaches to second limb 20. Shaft 16 of motor 12 attaches to first limb 18. In this instance, bushing 26 receives shaft 16. Conversely orifice (not shown) through first limb 18 can frictionally attach to first limb 18 and be received by hook 30.

Figure 8:
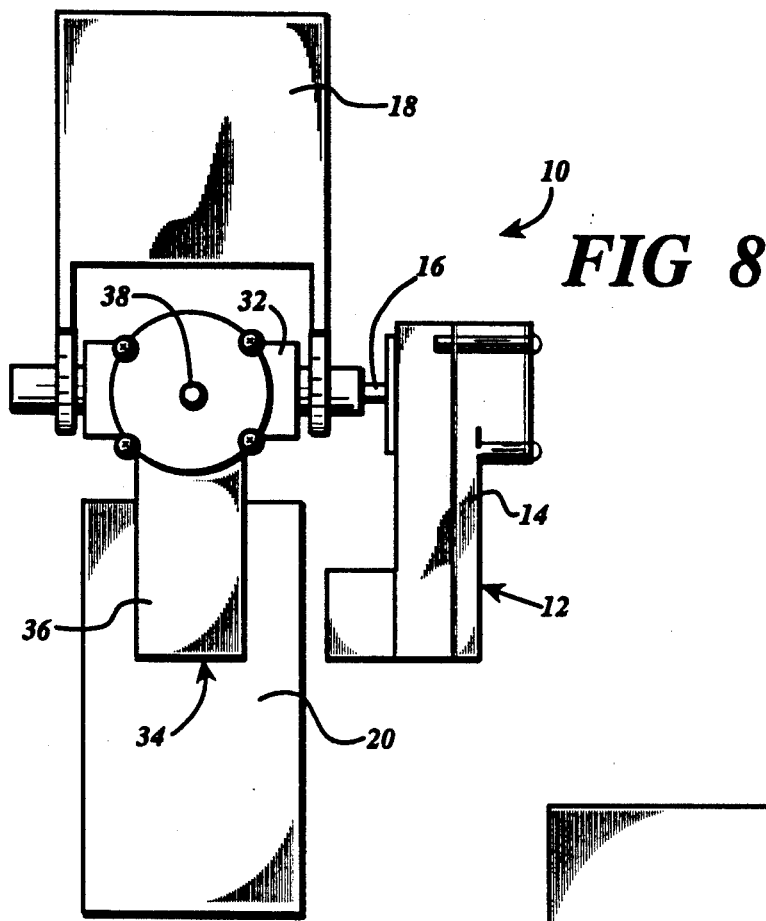
FIG. 8 is a front view showing a robotic joint allowing for omni-directional movement.

Referring now to FIG. 8, there is shown still another embodiment of the present invention. In this instance, two motors are used. Housing 14 of motor 12 attaches to second limb 20. Shaft 16 of motor 12 attaches to universal joint 32. Second motor housing 36 of second motor 34 attaches to second member 20. Second shaft 38 of second motor 34 attaches to universal joint 32. Motors 12 and 34 do not attach on the same plane. Universal joint 32 causes first limb 18 and second limb 20 to pivot omni-directionally. For example, shaft 16 attaches to first shaft 18 and passes through universal joint 32 so that motor 12 rotates on a plane into and out of the plane of limb 18. Second motor 34 attaches to universal joint 32 at shaft 38. Such that second motor 34 causes second limb 20 to rotate to the right and left from the view shown in FIG. 4. The combination of the front and back movement with the right to left movement causes rotation of second limb 20 with respect to first limb 18 to be omni-directional.

Figure 9:
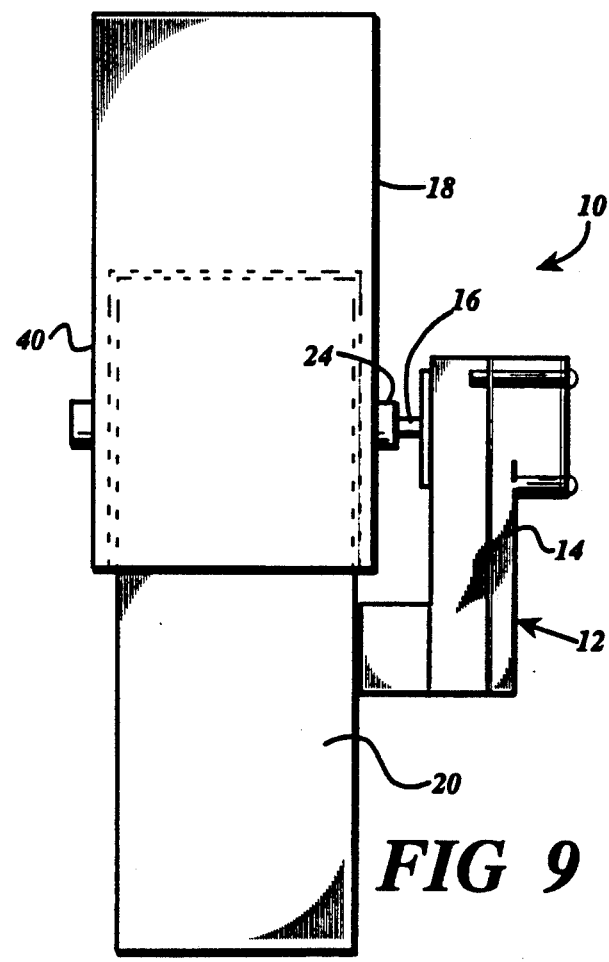
FIG. 9 is a front view showing second limb as part of first limb.

Referring now to FIG. 9, there is shown generally at 10 still another embodiment of the present invention. In this particular embodiment, second limb 20 fits inside channel 40 of first limb 18. Channel 40 prevents second limb 20 from moving in any direction except toward the opening of channel 40. This embodiment is similar to a human knee. Housing 14 of motor 12 attaches to second limb 20, whereas shaft 16 of motor 12 attaches to adapter 24 of channel 40 of first limb 18.

Shaft 16 of motor 12 can be attached to first limb 18 in several ways. Shaft 12 can be square and fit into a square adapter 24 that is part of first limb 18. Shaft 16 can pass through second limb and attach to first limb 18 such that second limb 20 rotates around shaft 16. Shaft 16 can have adapter 24 attached to it. Then adapter 24 will attach to first limb 18. Shaft 16 could be attached to first limb 18 with nail or screw fastener.

Housing 14 can attach to second limb 20 in several manners. Housing 16 can have some type of open circular band molded as part of housing 14 that could slip around second limb 20 and be held in elastically. Housing 14 can attach to second limb 20 through use of a screw or nail fastener. Housing 14 can be molded to have raised sections which frictionally fit to second limb 20. In essence, housing 14 can attach to second limb 20 in any fixed or releasable manner. Motor 12 can also be molded as part of second limb 20.

Joints 10 can be combined in various manners to simulate the action of different joints in the human body. By placing plural motors 12, 34 in substantially perpendicular alignment, omni-directional movement can be achieved. Also, the device 10 of FIG. 2 can be attached to second limb 20 of device 10 in FIG. 6. This would create four-way action of a hip joint and help the figure shift its weight to each side and move its leg forward. Device 10 of FIG. 8 allows for four-way action which can be used as the ankle joint in the animated figure. This is accomplished by having a third part attached to first limb 18 and second limb 20. Housing 14 and motor 12 would attach to first limb 18 with shaft 16 of motor 12 attached to this third part. Second housing 36 of second motor 34 is attached to second limb 20 with second shaft 38 attached to this third part such that shaft 38 runs perpendicularly in relation to shaft 16.

Present device 10 can be particularly adapted as a toy, because gear reduced motors with housing rotating around a fixed output shaft 12, 34 with a controller such as a computer can control movement in a very compact space and since each moving part can carry its own motor. This allows the animated figures to maintain balance without having a separate motor mounting fixture.

The present device provides a simple means of attaching the motor to the joint for a quick learning process for children in the construction and building of toys. The present invention is also very adaptable to toys like motorized vehicles requiring moving parts for action-like beds of trucks.

The joints of the present invention can be assembled in conjunction with another to perform only that motion which is needed. A robotic upper body could be assembled to have motion forward and backward and/or right and left and could be attached to a fixed base for more control or to legs with robotic joints.

Each of the robotic joints can be controlled by one or more small voltage motors which are computer controlled for locomotion or reversing direction. The computer controls the power that is send to the particular gear reduced motor. The current is reversed to make the motor move in the opposite direction.

Shaft 16 can fit over bushing 26 as well as into bushing 26. This fit can be frictional or releasable.

Figure 10:
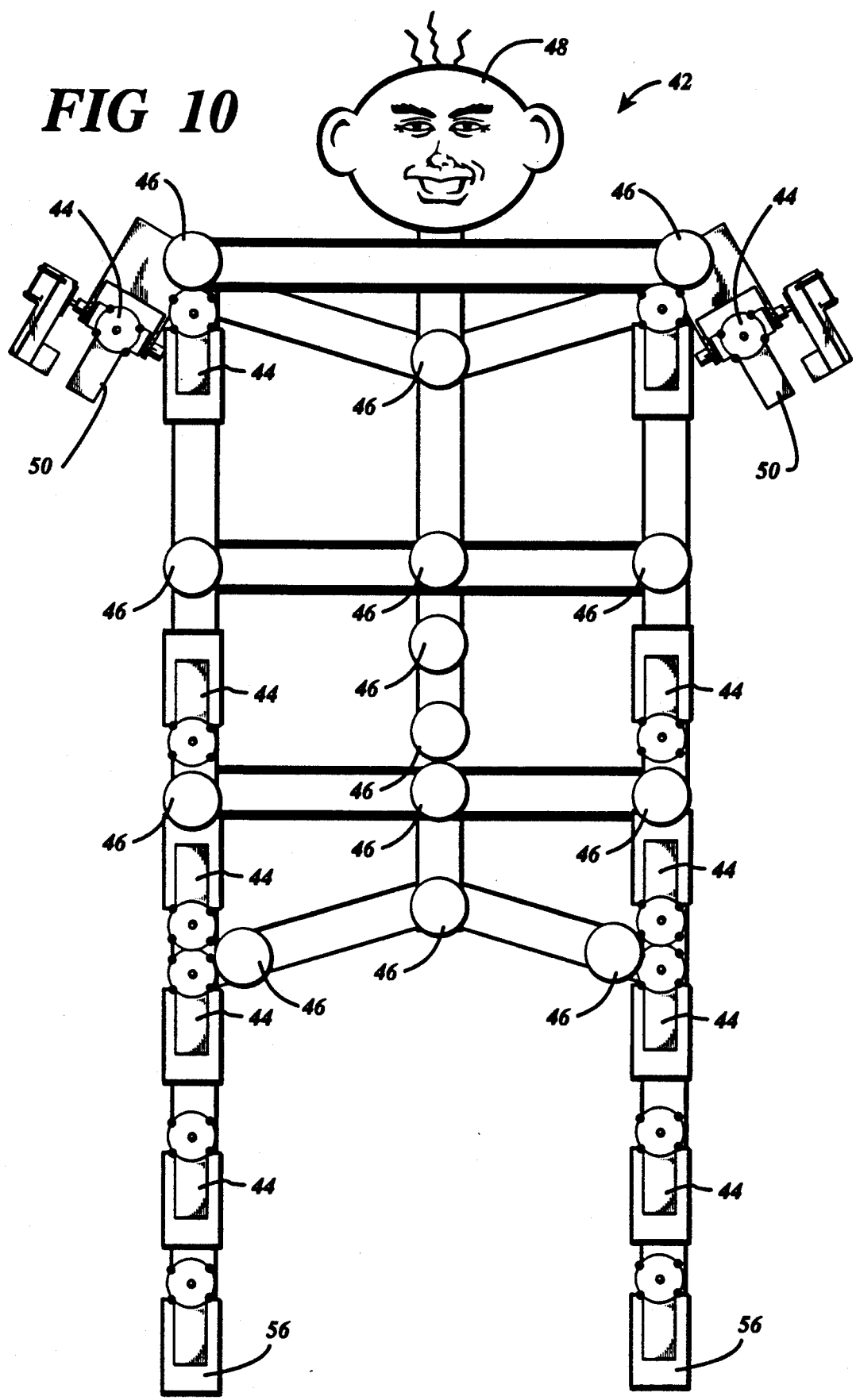

Referring now to FIG. 10, there is shown generally at 42 a robot constructed from the robotic joint movement device of the present invention. FIG. 10 shows connection of motorized joints 44 and non-motorized joints 46 attached so that the robot can move. As stated earlier, because motorized joint 44 actually carries motor (12), robot 42 is better able to keep its balance. Robot 42 has head 48, arms 50, body 52, and legs 54. Robot 42 rests on feet 56. Motorized joints 44 are robotic joint movement devices 10 that are shown in FIGS. 1-9. In the preferred embodiment, the connection between arm 50 and body 52 is universal 32-type connection shown in FIG. 8.

Figure 11:
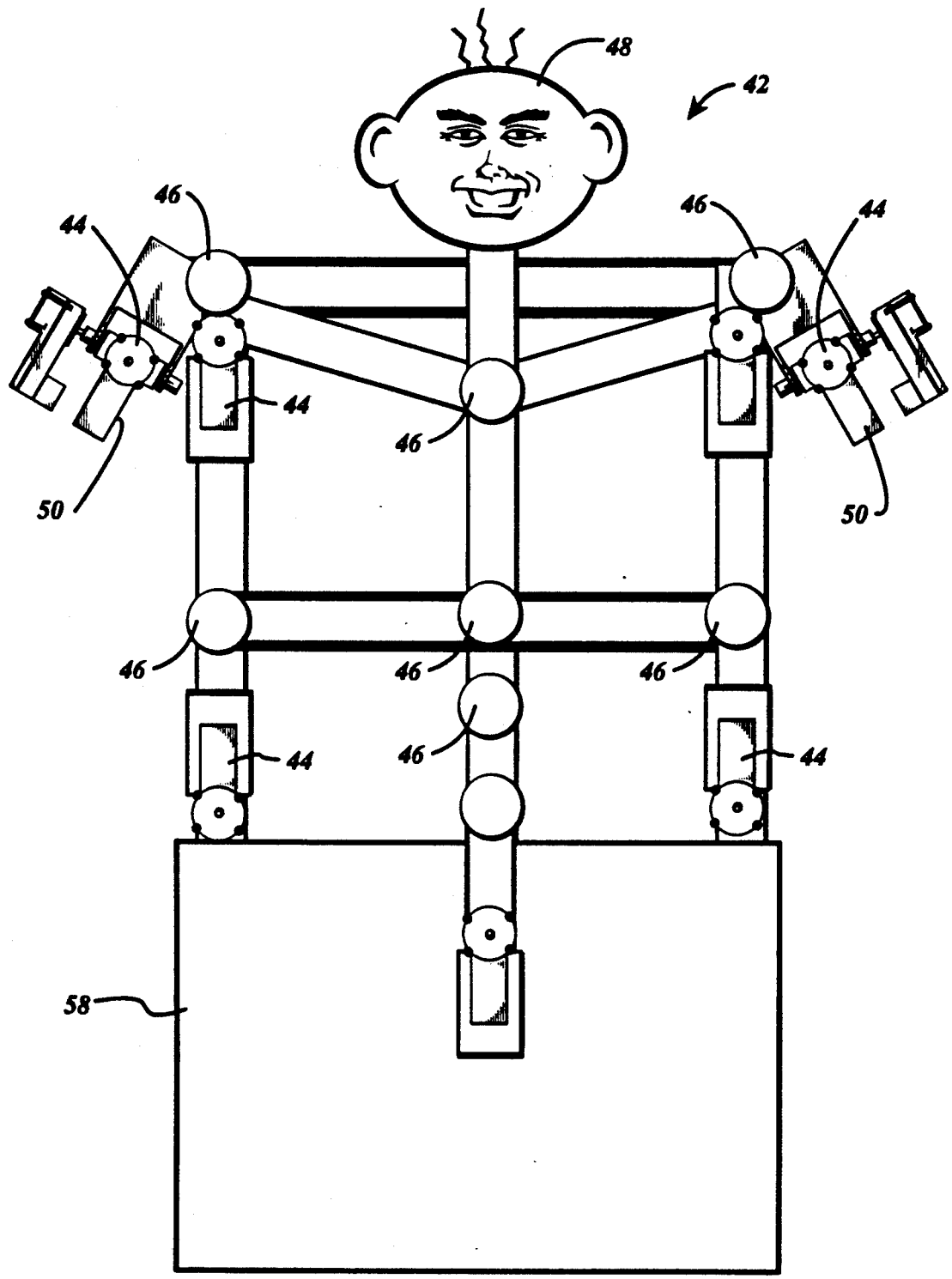
FIG. 11 is a front view of a robot using the robotic joint movement of the present invention having a fixed base.

Referring now to FIG. 11, there is shown generally at 42 another embodiment of robot. Once again, robot 42 consists of motorized joints 44 and non-motorized joints 46. To improve balance, fixed base 58 is provided to reside on ground or other flat surface.

Figure 12:
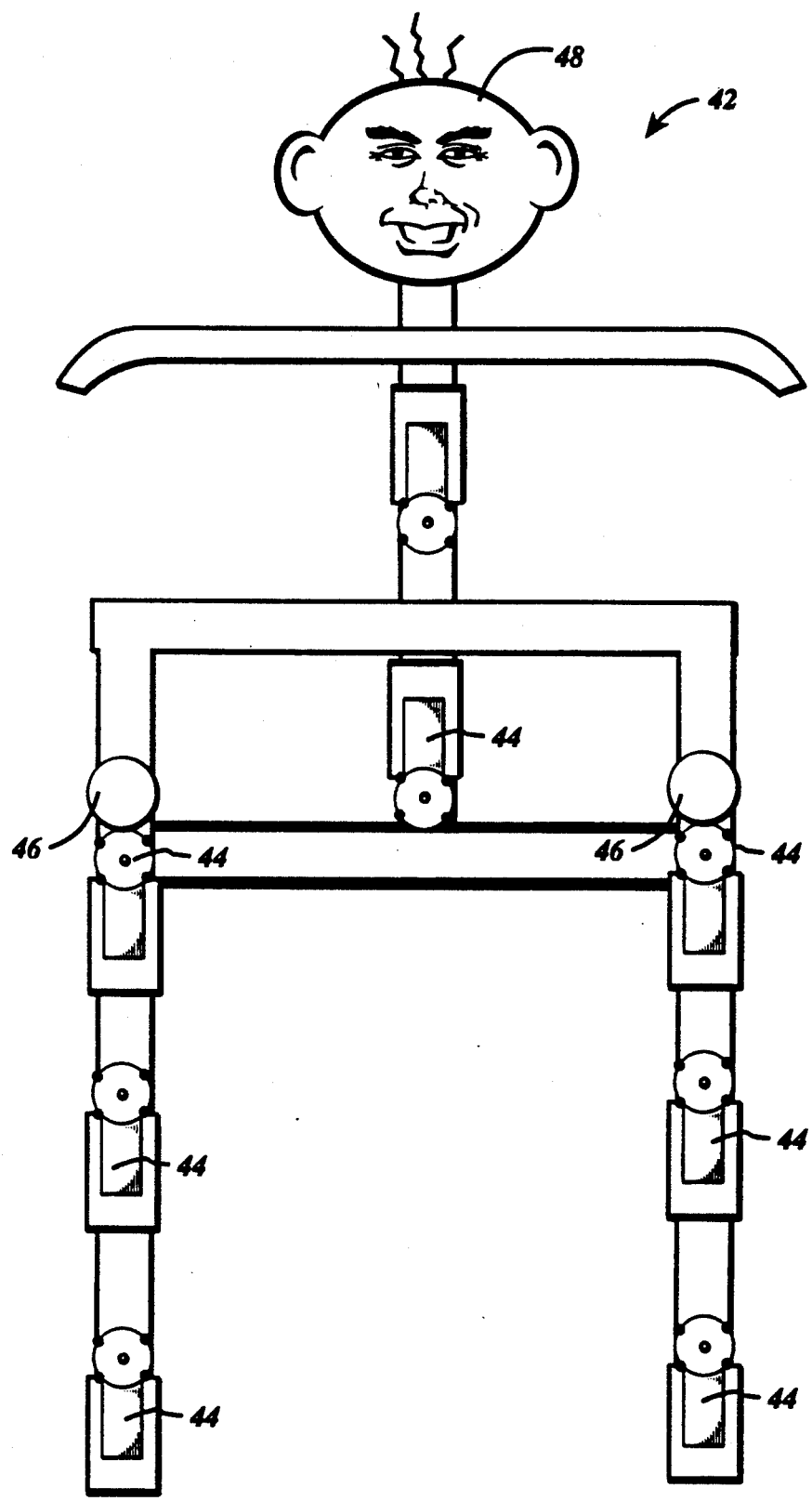
FIG. 12 is still another embodiment of a robot constructed from the robotic joint movement device of the present invention.

Referring now to FIG. 12, there is shown generally at 42 still another embodiment of a robot using the robotic joint movement device 10 of the present invention. Once again, robot 42 consists of motorized joints 44 and non-motorized joints 46. Once again, robot 42 can actually walk.

Figure 13:
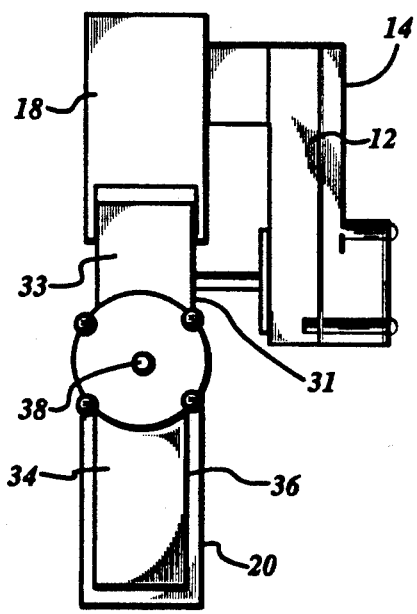
FIGS. 10 and 13 are front views of a robot using the robotic joint movement device of the present invention.

Referring now to FIG. 13, there is shown generally at 10 still another embodiment of the robotice joint movement device of the present invention. Housing 14 of first motor 12 attaches to first limb 18. Shaft 16 of first motor 12 attaches to bracket 31 of universal joint 32 fixedly attached to second limb 20. Second housing 36 of second motor 34 attaches to second limb 20. Second shaft 38 attaches to bracket 33 of universal joint 32 fixedly attached to first limb 18. Brackets 31, 33 are pivotally attached to form universal joint 32.

Thus, although there have been particular embodiments of the present invention of a new and useful robotic joint movement device, it is not intended that such references be construed as limitations upon the scope of this invention, except as set forth in the following claims. Further, although there have been described certain dimensions used in the preferred embodiment, it is not intended that such dimensions be construed as limitations upon the scope of this invention, except as set forth in the following claims.

What I claim is:

1. A robotic joint movement device which allows locomotion between a first limb and a second limb comprising:
    a universal joint universally connecting said first limb and said second limb, said universal joint having a first bracket fixedly attached to said first limb and pivotally attached to a second bracket and said second bracket fixedly attached to said second limb;
    a first motor having a first housing and a first shaft, said first housing attached to said second limb;
    said first shaft fixedly attached to said first limb and pivotally attached to said second bracket such that said shaft can rotate freely about said second bracket;
    a second motor having a second housing and a second shaft, said second motor aligned such that said second shaft is substantially perpendicular to said first shaft;
    said second housing attached to said second limb; and
    said second shaft attached to said second limb and pivotally attached to said first bracket such that said first bracket can rotate freely such that said first bracket can rotate freely about said second shaft.

2. The device of claim 1 wherein said first and second housings are releasable attached to said first limb.

3. The device of claim 1 wherein said first and second shaft are releasable attached to said universal joint.

4. The device of claim 1 wherein said first and second motors move said second limb through more than one plane in relation to said first limb.

5. A robotic joint movement device which allows locomotion between a first limb and a second limb comprising:
    a universal joint having a first bracket pivotally attached to a second bracket such that said second bracket is capable of omni-directional movement in relation to said first bracket;
    a first motor having a first housing and a first shaft, said first housing attached to said second limb;
    said first shaft attached to said first limb such that force provided by said first shaft moves said second limb;
    a second motor having a second housing and a second shaft, said second housing attached to said second limb substantially perpendicular to said first housing; and
    said second shaft attached to said first limb such that force provided by said second shaft moves said second limb substantially perpendicular to said first drive means.

6. The device of claim 5 wherein said first and second housings are releasable attached to said respective limb.

7. The device of claim 5 wherein said first and second shafts are releasable attached to said respective limbs.

8. The device of claim 5 wherein said first and second shafts move said second limb through more than one plane in relation to said first limb.

9. The device of claim 5 wherein said first and second shafts move clockwise and counterclockwise.

* * * * *